Jan. 9, 1934.  L. DÜRR  1,943,256
LIGHT WEIGHT GIRDER FOR AIRCRAFT
Filed Jan. 8, 1931
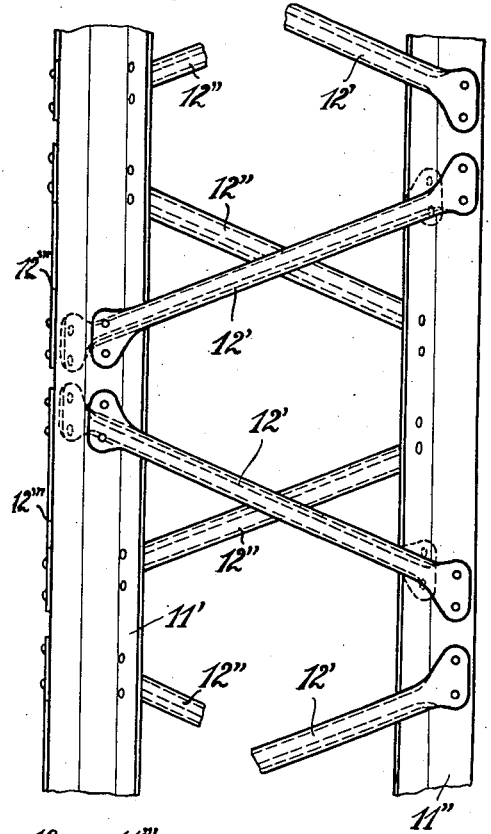
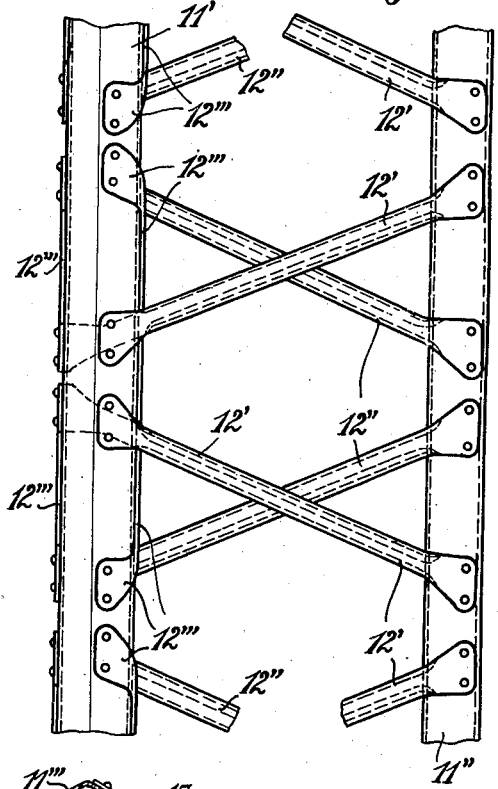
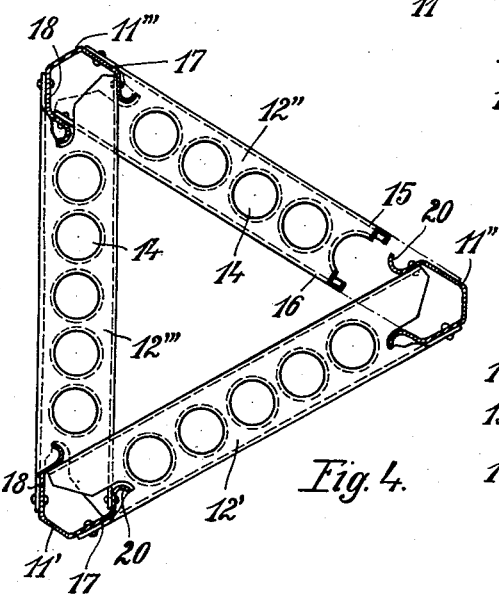
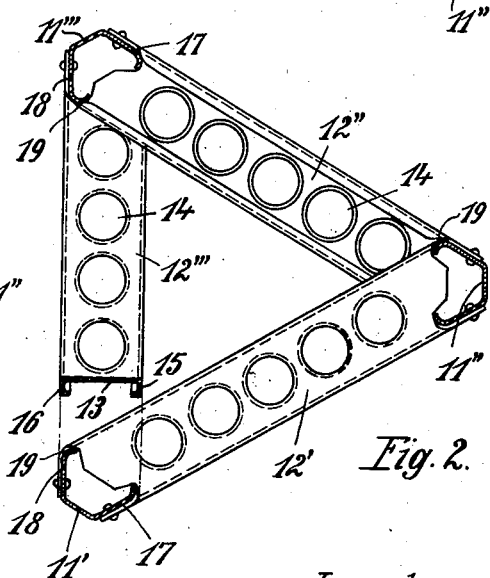
Inventor:
Ludwig Dürr,
by R. P. Tongue
Attorney.

Patented Jan. 9, 1934

1,943,256

UNITED STATES PATENT OFFICE 1,943,256

LIGHT WEIGHT GIRDER FOR AIRCRAFT

Ludwig Dürr, Friedrichshafen, Germany, assignor to Luftschiffbau Zeppelin Gesellschaft mit beschrankter Haftung, Friedrichshafen, Bodensee, Germany Application January 8, 1931, Serial No. 507,409, and in Germany January 29, 1930

8 Claims. (Cl. 189—37)

My invention relates to light weight girders, especially for aircraft construction, and it has special reference to girders or trusses of this kind having substantially triangular cross section and being assembled from three longitudinal chords with connecting stays or braces.

The main objects of my invention are saving in weight and increase in the efficiency of such girders with regard to resistance as compared to their weight.

For this purpose the new girder according to my invention is assembled from three open channels forming the three longitudinal chords and from braces connecting these channels to each other, these braces in themselves again forming trusses comprising chord portions and connecting brace portions. The longitudinal channels are of polygonal cross section. The chord portions of the stays are connected to the sides of these channels in such manner that the first one of the two chord portions of a stay is connected to one side of the polygon whereas the second chord portion is connected to another side thereof. Preferably the two sides of the polygon to which the two chord portions of a stay are connected should be situated substantially opposite each other.

Frame-work girders constructed in this new way according to my invention are extremely light and yet of great strength and resistance, especially against breaking or upsetting strains. Using open channels for the longitudinal main chords has the advantage that the stays can be rivetted to the same very easily, because the inner portions of the channels are accessible. It is important that the chord portions of the stays should be connected to different sides of the polygonal cross section of the main longitudinals because this feature adds materially to the stiffness of the longitudinal main chords and increases their resistance against distortion.

Having given a general description of my invention I now want to point it out more in detail having reference to the drawing which represents two examples embodying my invention.

Figs. 1 and 3 are side views of girder portions and Figs. 2 and 4 are corresponding cross sections, respectively.

One example is represented in Figs. 1 and 2, whereas Figs. 3 and 4 show another modification of my invention.

In all four of the figures the main longitudinal channels are designated by the numerals 11', 11" and 11'''. The main braces 12', 12" and 12''' are rivetted to these channels. Braces 12' connect chord 11' to chord 11", braces 12" connect chord 11" to chord 11''' and braces 12''' form connection between chords 11''' and 11'.

The main braces 12', 12" and 12''' again are made from open channels but with openings or apertures 14 in their middle portions. Thus they form trusses in themselves having chord portions 15 and 16 and connecting staying or bracing portions 13. They may, of course, as well be assembled from individual pieces such as channels or the like for chords and any kind of connecting lattices or the like serving as braces.

In the example shown in Figs. 1 and 2 the shape of the channels 11', 11" and 11''' is different from that of the corresponding channels in Figs. 3 and 4. In the first example the edges of the main channels are bent inwardly, as shown at 19, whereas with the other example outwardly bent edges 20 are provided. Consequently, the upper and lower chords 15 and 16, respectively, of the main braces are connected to the channel sides 17 and 18, respectively, of the main longitudinals 11', 11" and 11''' from the outside thereof, and it is necessary to bend one of these chords (in the example represented it is chord 15) in its end portion so as to get into the direction of channel side 17. If the cross sectional shape of the channels is chosen as in the example shown in Figs. 3 and 4 with outwardly bent flanges no bending of one of the chords 15 or 16 becomes necessary. They can be fastened to the respective channel side directly, but one touching its channel side from the outside and the other one being fastened to its channel side from the inside, as may be seen at 17 and 18, respectively, in Fig. 4.

I do not want to be limited to the details described or shown in the drawing as many variations will occur to those skilled in the art.

What I claim is:

1. A light weight girder, especially for aircraft comprising; at least three substantially parallel main chords made from open channels; and main braces connecting said channels with one another; said braces each having a first and a second chord portion and connecting brace portions; said channels in cross section having substantially polygonal shape; said first chord portions of said main braces being connected to one leg of said channels, and said second chord portions of said main braces being connected to another leg of said channels.

2. A light weight girder, especially for aircraft comprising; at least three substantially parallel main chords made from open channels; and main braces connecting said channels with one another; said braces each having a first and a second chord portion and connecting brace portions; said channels in cross section having substantially polygonal shape; said first chord portions of said main braces being connected to one side of said channels, and said second chord portions of said main braces being connected to a second side thereof, there being at least one third side between said first and said second side of said channels.

3. A light weight girder, especially for aircraft, as claimed in claim 2, further characterized in that said first and said second channel sides to which the chord portions of said main braces are connected are situated substantially opposite to each other with regard to the cross sectional shape of said channels.

4. A light weight girder, especially for aircraft, as claimed in claim 1 further including the features that the longitudinal edges of said longitudinal channels are bent outwardly, and that one chord portion of each of said main braces is attached to its channel side from the outside of the channel and that the other chord portion thereof touches its channel side from the inside of the channel.

5. A light weight girder especially for aircraft comprising; at least three substantially parallel main chords made from open channels; and main braces connecting said channels with one another; said braces each having a first and a second chord portion and connecting brace portions; said channels in cross section having substantially polygonal shape with outwardly bent edges; said first chord portions of said main braces being connected to one leg of said channels, and said second chord portions of said main braces being connected to the oppositely situated leg of said channels.

6. A girder comprising at least three corner members formed with a plurality of sides or legs, and cross braces securing the corner members to each other in spaced relation, said cross braces being formed with a plurality of sides, one of the sides of each brace being secured to one of the sides of a corner member and another side of the same brace being secured to another side of the same corner member.

7. A girder comprising at least three corner members formed with a plurality of sides or legs, and cross braces securing the corner members to each other in spaced relation, said cross braces being substantially U-shaped in cross-section, the sides of the braces forming the legs of the U being extended and secured to different sides or legs of the corner members.

8. A girder comprising at least three corner members formed with a plurality of sides or legs, and cross braces securing the corner members to each other in spaced relation, each of the cross members being secured at its ends to more than one side of a corner member.

LUDWIG DÜRR.